United States Patent [19]
Skala

[11] 3,911,288
[45] Oct. 7, 1975

[54] ENERGY TRANSPORT SYSTEM AND METHOD

[76] Inventor: Stephen F. Skala, 3839 S. Wenonah Ave., Berwyn, Ill. 60402

[22] Filed: Jan. 21, 1974

[21] Appl. No.: 435,117

Related U.S. Application Data

[63] Continuation-in-part of Ser. No. 301,285, Oct. 27, 1972, abandoned.

[52] U.S. Cl............. 307/147; 174/DIG. 7; 174/9 F
[51] Int. Cl.² ........................................ H01B 1/02
[58] Field of Search.. 307/147; 174/47, 9 F, DIG. 7; 136/85, 234

[56] References Cited
UNITED STATES PATENTS 1,748,927   2/1930   Kremer .......................... 174/DIG. 7
2,594,594   4/1952   Smith ................................. 200/233

FOREIGN PATENTS OR APPLICATIONS
1,412,512   12/1964   France ........................... 174/DIG. 7

Primary Examiner—Robert K. Schaefer
Assistant Examiner—John W. Redman
Attorney, Agent, or Firm—Dominik, Knechtel, Godula & Demeur

[57] ABSTRACT

A liquid metal, such as sodium potassium eutectic NaK, is a recycleable fuel which is transported from a generating facility to distributing stations through underground pipelines. The liquid metal within the pipeline transmits electrical power. An adjacent pipeline returns reaction products of the liquid metal in solution to the generating facility for reconversion to liquid metal.

18 Claims, 8 Drawing Figures

ENERGY TRANSPORT SYSTEM AND METHOD

This application is a continuation-in-part of Ser. No. 301,285 filed Oct. 27, 1972 and now abandoned by the same applicant.

FIELD OF INVENTION

This invention relates to the transport of energy. In one aspect, electrical energy is transmitted through liquid metal in insulated pipes. In another aspect, chemical energy is transported through the same pipes as a liquid metal. In yet another aspect, oxidized fuel is transported back for regeneration.

BACKGROUND

Energy released from primary sources such as fossil or nuclear fuels may be used by energy consuming devices directly, or it may be transformed to intermediate forms such as electrical power or various synthetic fuels. Direct use of local clean fuels is ideal, but in most cases, energy must be transported over increasing distances. Fuels such as gasoline and coal are becoming more expensive because of scarcity and required pollution controls. Accordingly, adjustments are being made in all components of present energy systems to improve efficiency and reduce total cost. An energy system, however, cannot eliminate all undesirable factors, but rather attempts to provide a reasonably balanced system from primary source to end use which is economical and convenient.

Two major contenders for a future energy system are an all electric economy and an economy based on hydrogen as an intermediate energy carrier. As any energy system, each has undesirable factors. An all electrical system has high transmission costs, inconvenience for non-stationary uses, and a reduction in diversity of energy consumming devices. A hydrogen system is inefficient in conversion from and reconversion to electrical energy. Storage is also complex. A combined electrical and hydrogen system uneconomically duplicates facilities.

Alkali metals have been used for energy related purposes, but a comprehensive alkali metal energy system has not been disclosed. The art has recognized that alkali metals can be used as a fuel, as electrical conductors, and recognizes methods for regenerating alkali oxides to their metallic states. Further, the art recognizes the unique uses of liquid metals as a working fluid for electromagnetic pumps and as a means of interrupting electrical current.

Alkali metals have been used as a source of energy in heat engines and fuel cells. An example of an alkali metal-air fuel cell is provided by C. A. Crowley in U.S. Pat. No. 2,921,110. The use of sodium as a conductor in an insulated cable is described, for example, by V. S. Davey in "Electronics and Power" November 1969. Regeneration of sodium or potassium hydroxide by electrolysis of the molton salt has been disclosed by Castner in U.S. Pat. No. 453,030. Improved efficiency results from removal of water and oxygen formed at the anode.

OBJECTS AND ADVANTAGES

It is one object of the present invention to provide an energy transport system which transmits electrical power and transports liquid metal fuel in common pipes. Such energy can be used by diverse energy consuming devices.

It is another object to provide an energy transport system which allows economic selection of energy from among direct electrical energy, locally generated electrical energy and fuel energy along a transmission line.

It is another object to provide an energy transport system which is efficient over long distances and includes a fuel which is economical to transport and store.

It is another object to provide an energy system using a fuel, the spent products whereof can be returned from a utilization site to a regeneration site for reuse.

It is another object to provide electric cables and electrical transmission lines which are made of low cost materials, are simple to assemble, are convenient to install, and are easy to join together.

SUMMARY

These and other objects which shall become apparent from time to time are accomplished in accordance with the present invention wherein a liquid metal alloy of sodium and potassium, called NaK, is both an intermediate energy carrier or synthetic fuel, and the conductor portion of an electrical transmission line. In the preferred embodiment, electrical power is transmitted as high voltage D. C. in a pair of underground pipes which also transport NaK. When NaK is reacted to obtain chemical energy, the reaction products are returned to a regenerating means as dissolved hydroxides in another pipeline. Since NaK is recycled, its principle costs are transport and regeneration. These costs can be sufficiently small so that a large cross sectional area can economically improve transmission line efficiency, which can be further improved by immersion of sodium cable in the NaK. Since the conductor is a liquid, problems of joining cable are eliminated and the conductor can flow through heat exchangers for cooling. The transmission system terminates at distributing stations where NaK is isolated from electrical power and electrical power is converted to lower voltage. The distributing station can generate additional electrical power by using NaK as a fuel in an oxidative reaction in a fuel cell. The distributing station can supply customers with combined NaK and electrical power lines.

NaK eutectic with 22 percent sodium has a resistivity of about 40 micro ohm-cm., a viscosity of about 0.5 centipoise, a freezing point of about −11°C, and a heat capacity of about 0.23 cal/gm°C. Reference may be made to "Liquid Metals Handbook" R. N. Lyon (1954) U.S. Government Printing Office.

DESCRIPTION OF DRAWINGS

Figure 1:
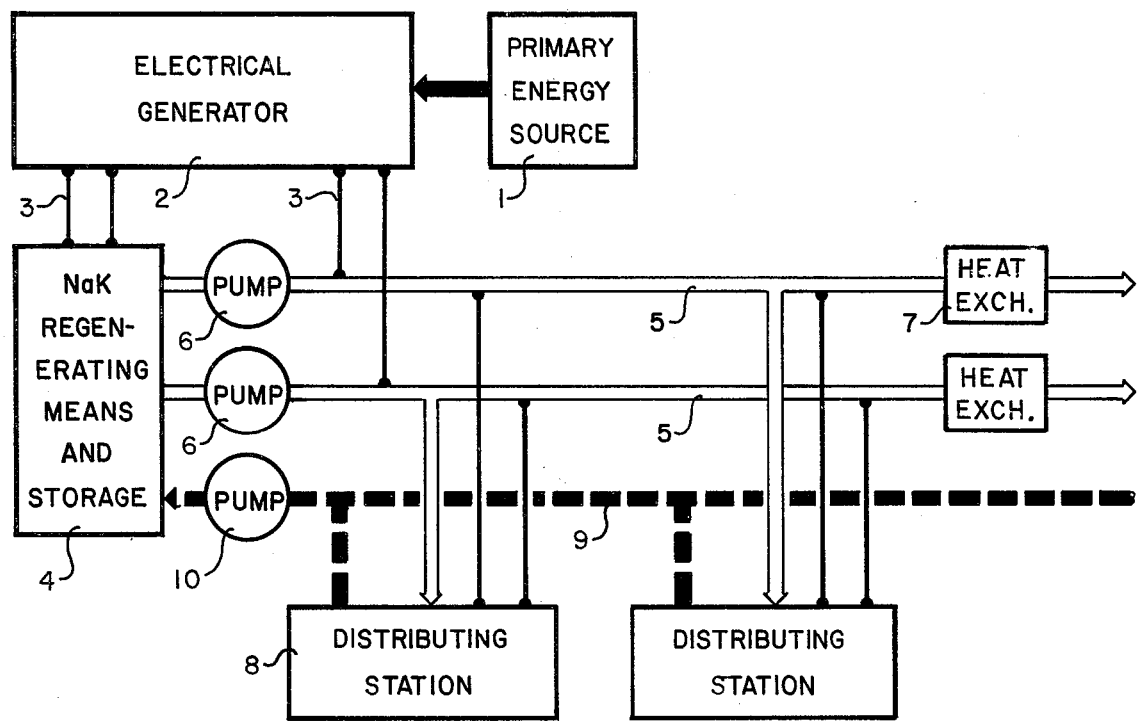
FIG. 1 is a schematic drawing of an energy transmission system incorporating basic features of this invention.

The schematic illustration of FIG. 1 shows the improved features of the present invention.

A primary energy source 1 can take the form of a nuclear reactor which provides steam to drive a turbine which operates an electrical generator 2. The electrical power output of the electrical generator is connected by cables or conductors 3 to supply two basic loads. One of these loads is a NaK regenerator and storage means, collectively indicated at 4. Spent hydroxides from liquid metal fuel are returned to the regenerator and converted to the liquid metal form by the use of conversion means such as electrolysis.

The liquid metal NaK releases large amounts of energy when this alloy is reacted with oxidizers such as water or oxygen. Also formed are reaction products such as the spent hydroxides of the metals and hydrogen. Means such as electrolysis regenerates the spent hydroxides of the metals to the liquid metal form. Such regenerated liquid metal is then stored in a portion of the receiving means collectively indicated at 4. The storage means may be a reservoir which holds the regenerated NaK during periods of lower electrical power demand, and supplies such NaK when the electrical power demand increases.

The electrical cables or conductors 3 also join transmission lines 5 which represent the other load. These lines are preferably electrically insulated underground pipes through which liquid metal NaK is moved under urging of pumps 6. These pumps may be of conventional design such as motor powered centrifugal pumps, or they may be electro magnetic such as described by J. L. Ledeen in U.S. Pat. No. 3,302,573. Booster pumps, not shown, are located along the length of the transmission line to facilitate movement of the NaK. Also located along the length of the transmission line are heat exchangers 7 which cool the moving NaK liquid metal carrying the electrical energy. Such direct cooling of the liquid metal is an advantage over indirect oil cooling of present underground electrical cables.

The liquid metal NaK and the electrical energy carried or conducted by the liquid metal is delivered along pipelines 5 into distributing means or stations 8. The electrical energy levels are utilized in such a distributing station, as well as the chemical fuel energy of the liquid metal. Following chemical energy conversion, the spent hydroxides from the distributing station are returned by way of pipeline 9, and the movement of such spent hydroxides is urged by pump means 10. These spent hydroxides or reaction products are returned to the generator and storage means 4.

Figure 2:
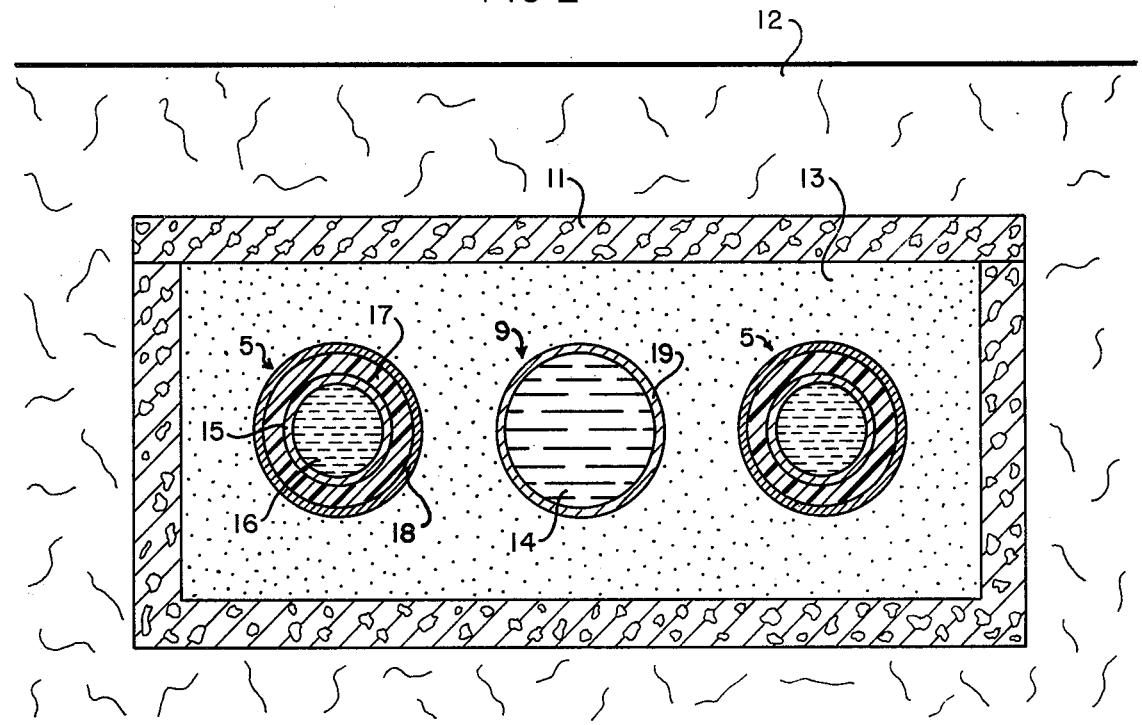
FIG. 2 represents a section of underground transmission lines for NaK and electrical power with a return line for reaction products.

FIG. 2 shows the NaK transmission line and return pipe for reaction products in an underground vault. A description of underground structures for conventional high voltage transmission lines may be found, for example, in "Power Cables" by C. C. Barnes (1966) page 148. A concrete vault 11 buried in ground 12 is back filled with oil impregnated sand 13. Return pipeline 9 contains reaction products 14 in pipe 19 made of resistant materials such as plastic or iron. Transmission line 5 has an inner pipe 15 filled with NaK 16. An electrical insulation 17 such as oil impregnated paper tape surrounds the inner pipe and a moisture impervious cover 18 protects the electrical insulation. An alternate insulation structure is disclosed by P. A. Denes in U.S. Pat. No. 3,711,631.

Figure 3:
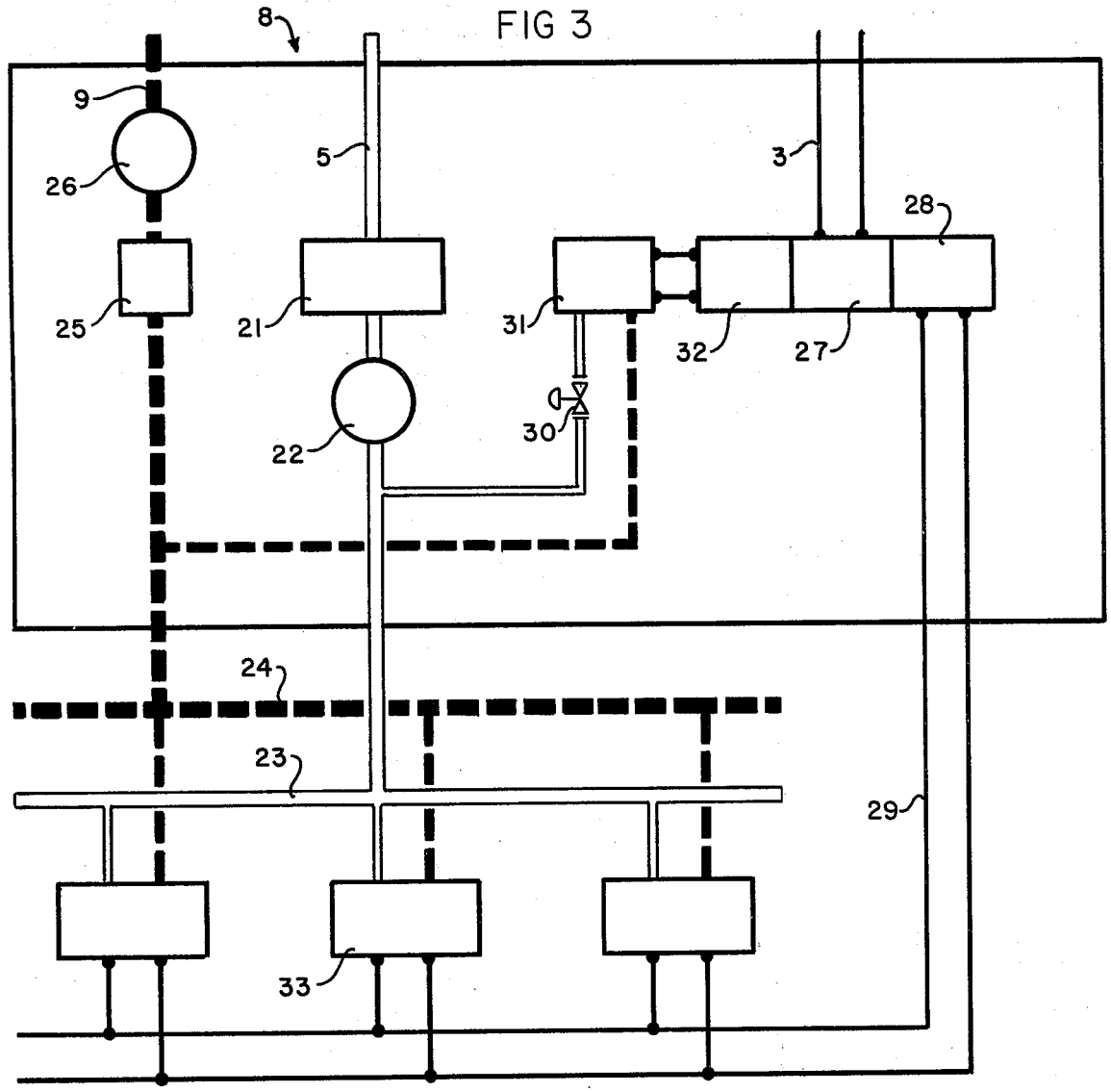
FIG. 3 is a schematic drawing of a NaK and electrical power distributing system.

FIG. 3 shows the distribution station in more detail together with connecting line to customer utilization means. NaK flowing in transmission line 5 enters an interrupter and reservoir 21 which isolates high voltage from the liquid metal to maintain an open electrical circuit. Known methods of isolation include streams which break into drops and means to accumulate NaK in one reservoir while previously accumulated NaK is drained from another reservoir. A pump 22 injects NaK under pressure into distribution lines 23. Reaction products in solution are pumped into return line 24, into reservoir 25, through pump 26, and into return pipeline 9. Cables 3 connect to motor 27 which drives generator 28 which converts high voltage, electrical power to a lower voltage, for distribution over cables 29.

Electrical power for distribution may also be derived from NaK. NaK flows through control valve 30 into fuel cell 31 where the NaK is oxidized to provide electrical power through an invertor to cables 29 or, as shown, to motor 32 which drives the generator. The customer utilization means 33 which are supplied NaK and electrical power include homes, industrial plants, and service stations for vehicles.

Figure 4:
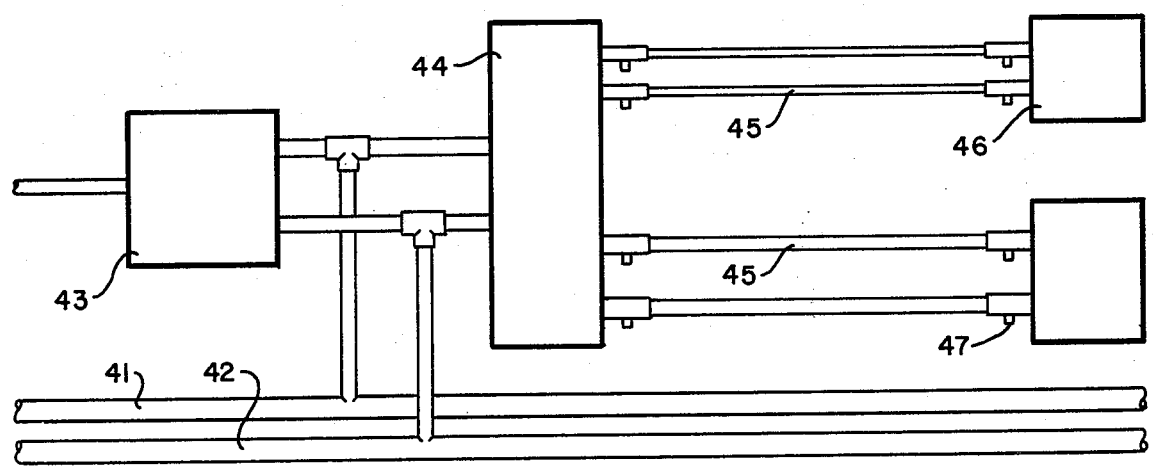
FIG. 4 is a somewhat schematic drawing of combined NaK and electrical power distributing lines along with NaK filled cable.

FIG. 4 is a distribution system which combines electrical and NaK distribution lines, and uses fillable plastic or other insulated pipe for wiring. A pair of NaK lines 41 and 42 of opposite polarity connect to an interrupter 43 and a junction panel 44. NaK flows through the interrupter to various customer utilization means, not shown, and electrical current flows through the junction panel. The interrupter provides liquid metal isolated from electrical energy, and the panel provides electrical energy separated from the liquid metal. Cables such as 45 connect to loads 46. The cables are preferably tubes of plastic such as polyethylene. Fitting connectors 47 are provided for initial filling and replacement of NaK. The junction panel may also have means for converting electrical energy to lower voltage.

Figure 5:
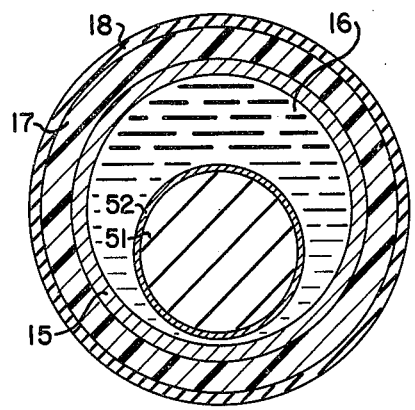
FIG. 5 is a section view taken along line 5—5 of FIG. 6.
Figure 6:
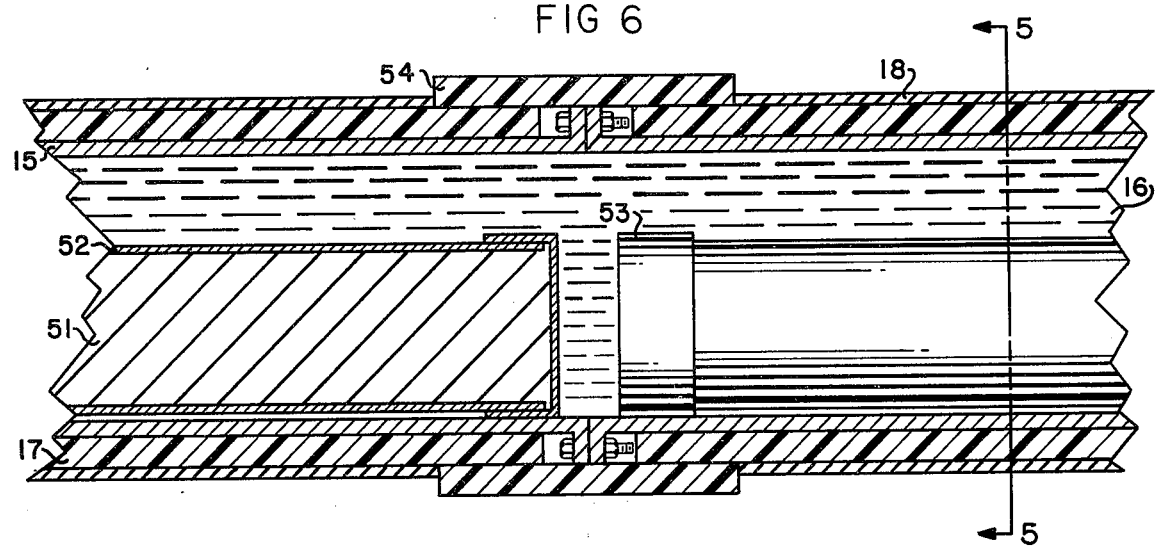
FIG. 6 is a somewhat schematic side elevational view, mostly in section, of an energy pipeline including liquid metal and spaced solid conductors.

FIGS. 5 and 6 show an electrical transmission line combining the features of a liquid metal system with the improved conductivity of a solid conductor. At a temperature of 50°C, for example, NaK has a resistivity of 37.5 micro-ohm-cm., sodium has a resistivity of 5.4 micro-ohm-cm and copper, as a reference, has a resistivity of 1.9 micro-ohm-cm. Since sodium has a low cost for conductivity, it is preferred as the solid conductor, although other solid conductors are within the scope of this invention. FIGS. 5 and 6 are similar to transmission lines 5 in FIG. 2, but there is added immersed within liquid metal 16, a cable of sodium 51 sealed within a metal envelope 52. Envelope 52 prevents dissolving of the sodium cable by the surrounding NaK. The sodium cable may be sections immersed in NaK as shown in FIG. 6. Electrical contact between segments is provided by NaK. The sections of sodium cable include a tube 52 formed from a metal such as copper or steel, filled with sodium, and sealed with end caps 53. An insulating ring 54 joins adjacent pipes.

Figure 7:
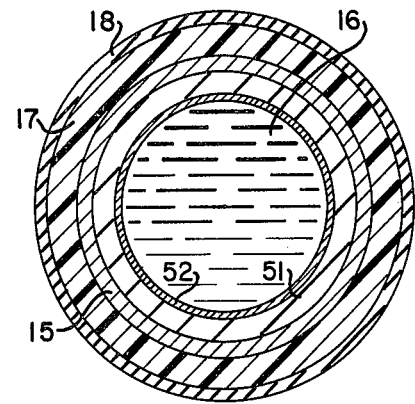
FIG. 7 is a section view taken along line 7—7 of FIG. 8.
Figure 8:
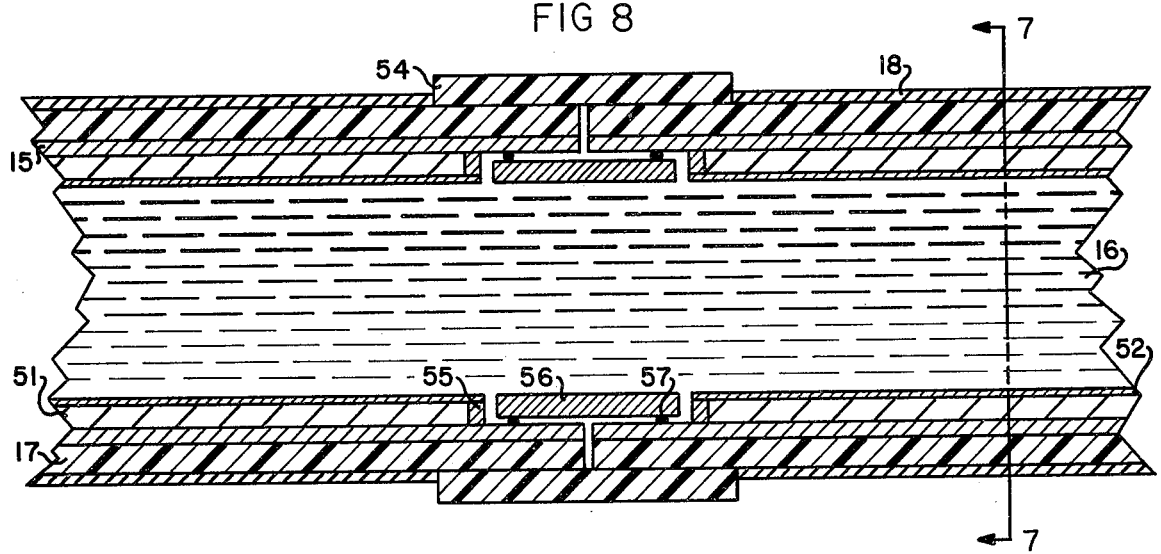
FIG. 8 is a somewhat schematic side elevational view in section of another embodiment of an energy pipeline including liquid metal and spaced solid conductors.

FIGS. 7 and 8 are similar to the transmission lines in FIGS. 5 and 6, but the solid conductor has an annular configuration providing improved heat transfer. Sodium 51 is an outer cylinder protected by envelope 52 and end rings 55. A coupling ring 56 and sealing rings 57 join adjacent pipes.

The claims of the invention are now presented, and terms used in such claims may be further understood by reference to the language of the preceding specification and the views of the preceding drawings.

What is claimed is:

1. A method for transmitting electrical energy and delivering liquid metal fuel along a pipeline, including the steps of moving said liquid metal through a pipeline, connecting generated electrical power to said liquid metal within said pipeline, using said electrical energy carried by said liquid metal at a location along said pipeline, and oxidizing said liquid metal fuel to obtain energy at a location along said pipeline.

2. A method which includes the steps of claim 1 and which further includes the step of delivering reaction products of the oxidized liquid metal along a return pipeline to a regenerating means which derives energy from an energy source, and delivering said liquid metal to said pipeline.

3. A method which includes the steps of claim 1 wherein said liquid metal is an alloy of sodium and potassium.

4. A method which includes the steps of claim 1 wherein said moving liquid metal fuel which transmits electricity travels in said pipeline underground and said pipeline is electrically insulated.

5. A method which includes the steps of claim 4 wherein said moving liquid metal passes through heat exchangers to selectively alter the temperature of the liquid metal.

6. A method which includes the steps of claim 1 wherein said location along said pipeline includes distributing stations where electrical energy and the liquid metal fuel are selectively utilized in a plurality of operating means.

7. A method which includes the steps of claim 6, and which further includes interrupting electrical energy conducted by said liquid metal at a holding zone, directing said liquid metal fuel into a distributing line, and converting electrical energy at said holding zone into lower voltage electrical energy, said lower voltage electrical energy being delivered to said distributing line.

8. A method which includes the steps of claim 7 and which further includes oxidizing said liquid metal fuel to develop electrical energy, and connecting said electrical energy to a distributing line.

9. A system for transmitting electrical energy and transporting liquid metal fuel, including receiving means for spent hydroxides formed by oxidizing a liquid metal fuel, a primary energy source operating an electrical power generating means, means connecting the electrical power generating means to said receiving means to regenerate said spent hydroxides to obtain the liquid metal fuel, a pipeline electrically insulated for high voltage, said pipeline joined to said receiving means for conveying the liquid metal fuel, pumping means to move said liquid metal fuel through said pipeline, conducting means between said electrical power generating means and said liquid metal fuel in the pipeline, and distributing means along said pipeline to use electrical energy conducted by the liquid metal fuel and to also use said liquid metal.

10. A system which includes the features of claim 9 which further includes a pipeline returning spent hydroxides formed by oxidation of said liquid metal to said receiving means, and pumping means to move said spent hydroxides along the pipeline to said receiving means for regenerating the spent hydroxides to liquid metal.

11. A system which includes the features of claim 9 wherein said pipeline is placed substantially underground.

12. A system which includes the features of claim 9 wherein said pipeline is joined to above ground heat exchangers.

13. A system which includes the features of claim 10 above and which further includes means to interrupt electrical energy conducted by said liquid metal, a pipeline connecting said distributing means to an ultimate customer utilization means, pumping means to move liquid metal through said connecting pipeline, converting means to change high voltage electrical energy to lower voltage electrical energy, conductive cables connecting said converting means to the ultimate customer utilization means, a return pipeline connecting the ultimate customer utilization means to said distributing means, and pumping means to move the spent hydroxides of said oxidized liquid metal along said connecting pipelines from the ultimate customer utilization means to said distributing means.

14. A system which includes the features of claim 13 and which further includes a fuel cell to oxidize said liquid metal to develop electrical energy, and means conducting said electrical energy to said ultimate customer utilization means.

15. A system which includes the features of claim 13 wherein the pipelines from the distributing means to the ultimate customer utilization means operates as an electric cable, said pipelines having at least two electrically insulated pipes connecting said electrical converting means and said liquid metal pumping means.

16. A system which includes the features of claim 15 which further includes an electrical distribution means joined to said interrupter means, said interrupter means providing liquid metal isolated from electrical energy and said electrical distribution means providing electrical energy separated from the liquid metal flow.

17. An electrical cable including a solid conductor member disposed within a portion of a pipe, the remaining inside portion of the pipe being filed with a liquid metal conductor wherein the solid conductor is a plurality of solid conductor members disposed along the pipe in spaced relationship to one another, and each of said solid conductor members being enclosed with a metal envelope, said liquid metal filling the spaces between the plurality of spaced solid conductor members.

18. An electrical cable which includes the features of claim 17 wherein said solid conductor member is sodium metal, and said liquid metal is an alloy of sodium and potassium.

* * * * *